US006868638B1

(12) United States Patent
Gardner

(10) Patent No.: US 6,868,638 B1
(45) Date of Patent: Mar. 22, 2005

(54) ROLLER ASSEMBLY FOR SUPPORTING A SLIDE-OUT ROOM

(76) Inventor: Stewart Gardner, 17812 County Rd. 10, Bristol, IN (US) 46507

( * ) Notice: Subject to any disclaimer, the term of this patent is extended or adjusted under 35 U.S.C. 154(b) by 0 days.

(21) Appl. No.: 10/196,453

(22) Filed: Jul. 16, 2002

Related U.S. Application Data

(60) Provisional application No. 60/307,818, filed on Jul. 25, 2001.

(51) Int. Cl.[7] ................................................ E04B 7/16
(52) U.S. Cl. ................................ 52/67; 384/50; 384/57
(58) Field of Search ............................. 52/67, 64, 36.1; 384/50, 54–57, 58, 53

(56) References Cited

U.S. PATENT DOCUMENTS 5,658,032 A * 8/1997 Gardner ........................ 296/26

5,690,264 A * 11/1997 Distefano et al. ........... 226/187

* cited by examiner

*Primary Examiner*—Naoko Slack

(57) ABSTRACT

A roller assembly for use with a slide-out room used in mobile homes, manufactured housing and recreational vehicles in which the assembly includes a roller journalled to a carrier. The carrier is mounted to a frame by an adjustable connection which allows a variation position of the carrier relative to the frame. The carrier is connected to the frame for articulated movement so as to allow the carrier and its roller to rock relative to the frame which is adapted for connection to either the slide-out room or the living area which forms a part of the mobile home, manufactured housing or recreational vehicle.

8 Claims, 7 Drawing Sheets

ROLLER ASSEMBLY FOR SUPPORTING A SLIDE-OUT ROOM

CROSS-REFERENCE TO RELATED APPLICATION

This is a continuation of provisional application Ser. No. 60/307,818, filed Jul. 25, 2001.

This invention relates to a roller assembly for supporting a slide-out room providing auxiliary living space for portable living quarters as the slide out room is extended from and retracted into the main living quarters.

BACKGROUND OF THE INVENTION

Mobile living quarters, such as recreational vehicles and manufactured housing, are commonly equipped with a slide-out room which can be retracted into the main living quarters in order to reduce the size of the living unit to that which can be accommodated to travel on public highways, and which may be extended from the main living quarters to provide an auxiliary living area when the unit is parked for use. Increasingly, such mobile living quarters have been provided with luxurious accommodations, such as carpeting, tile floors, and similar floor coverings. Of course, it is necessary that movement of the slide-out room as it is extended or retracted not damage such floor coverings. Furthermore, slide-out rooms must be maintained relatively level both during extension and retraction, and also when parked for use. If the slide-out room becomes out of alignment with the aperture in the main living quarters through which the slide-out room is extended and retracted, binding and other similar problems may result.

SUMMARY OF THE INVENTION

According to the present invention, a cylindrical roller assembly including a frame and a roller carrier on which a cylindrical roller is mounted is mounted on the frame via an adjustable connection to adjust the position of the roller relative to the frame. The roller carrier articulates with respect to the frame so that the roller can move relative both to the floor of the slide-out room and to the floor of the main living quarters as the slide-out room is extended and retracted. The roller is covered by a semi-rigid material that will not mark or otherwise damage the floor as the slide-out room is extended and retracted. Because of the articulating connection between the roller carrier and the frame, the roller can flex slightly relative to the floor of the main living quarters to accommodate any vibration, bumps or similar road shocks during transportation. Accordingly, the roller will not damage the floor as often occurs in prior art slide-out rooms in which the slide-out room is supported through a rigid connection. In such prior art arrangements, damage the floor of the main living quarters may result, particularly if the floor is a tile floor or a similar easily damaged material. The roller thus is also able to accommodate movement between carpeted and tiled sections of the floor when the slide-out room is extended and retracted.

BRIEF DESCRIPTION OF THE DRAWINGS

These and other advantages of the present invention will become apparent from the following description, with reference to the accompanying drawings, in which.

DETAILED DESCRIPTION

Figure 1:
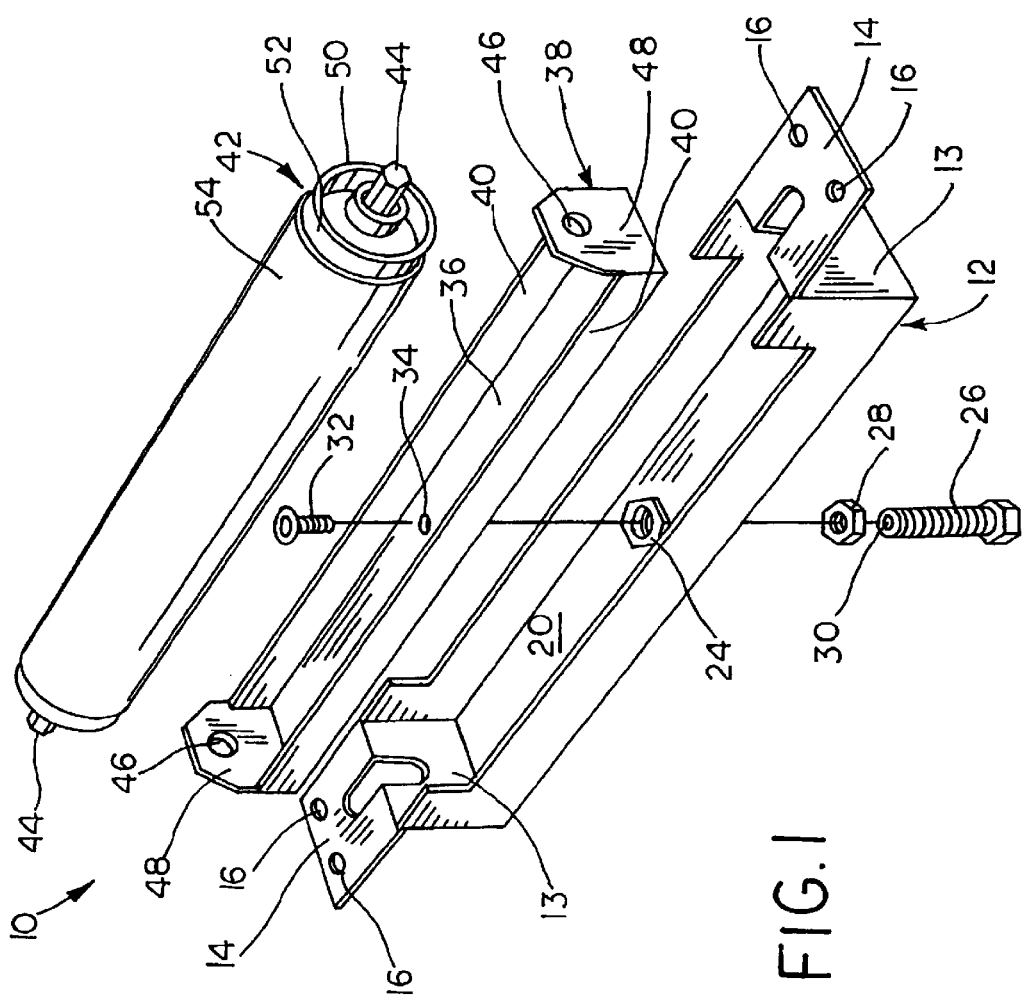
FIG. 1 is an exploded view in perspective of the roller assembly made pursuant to the teachings of present invention.
Figure 2:
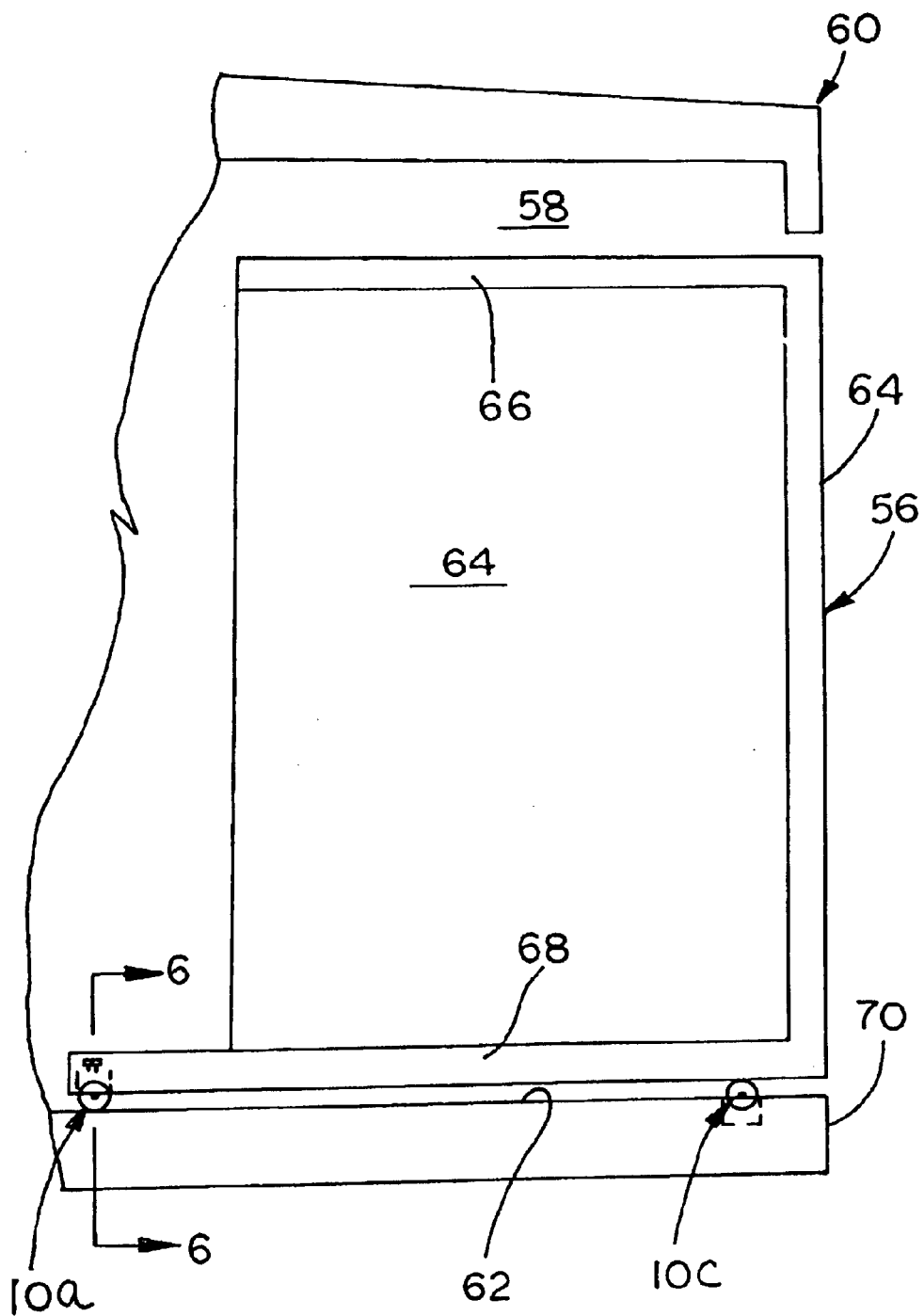
FIG. 2 is a fragmentary cross-sectional view in through the mobile living quarters and slide-out room, the slide-out room being illustrated fully retracted within the main living quarters.
Figure 3:
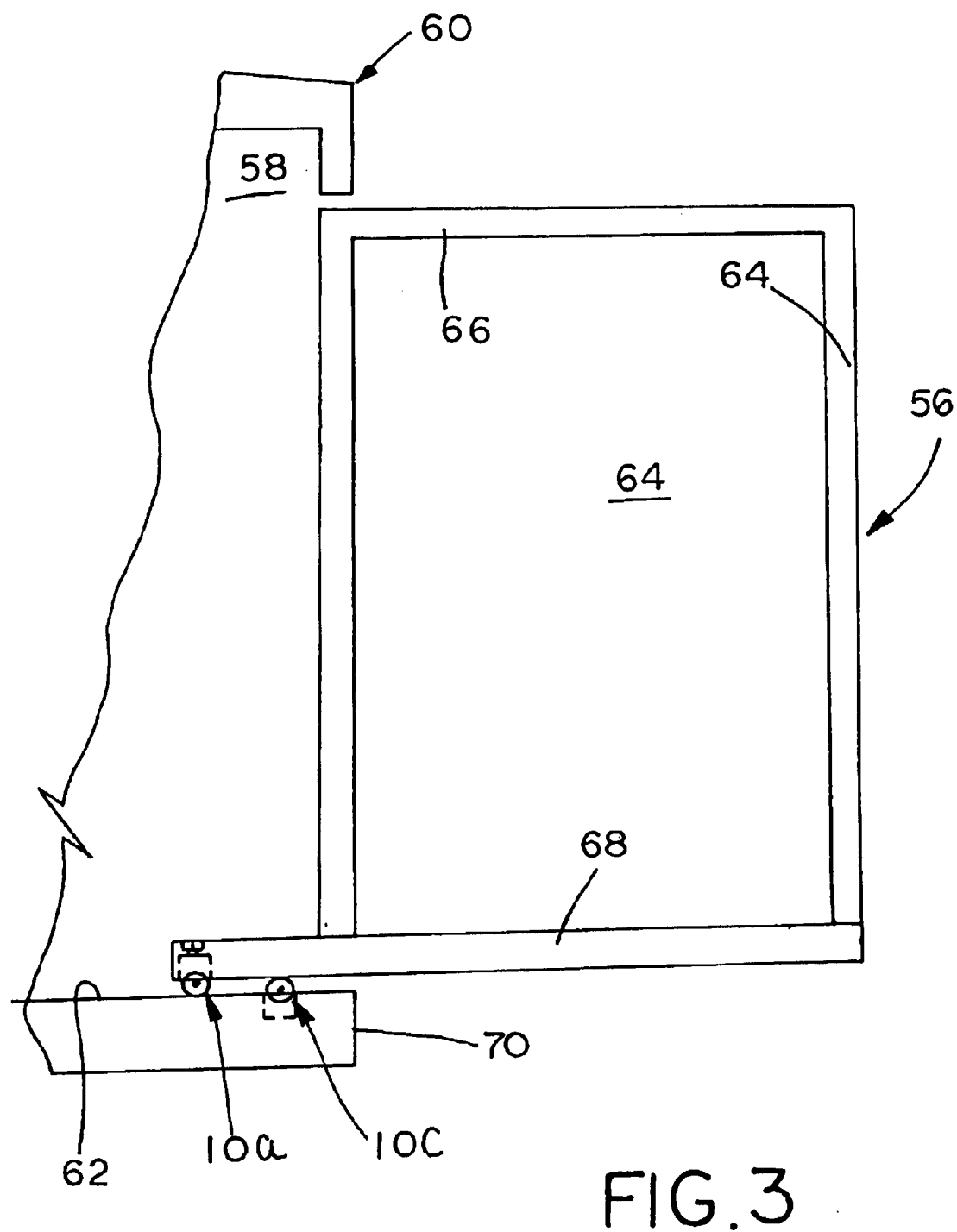
FIG. 3 is a view similar to FIG. 2, but illustrating the room in its fully extended position.
Figure 4:
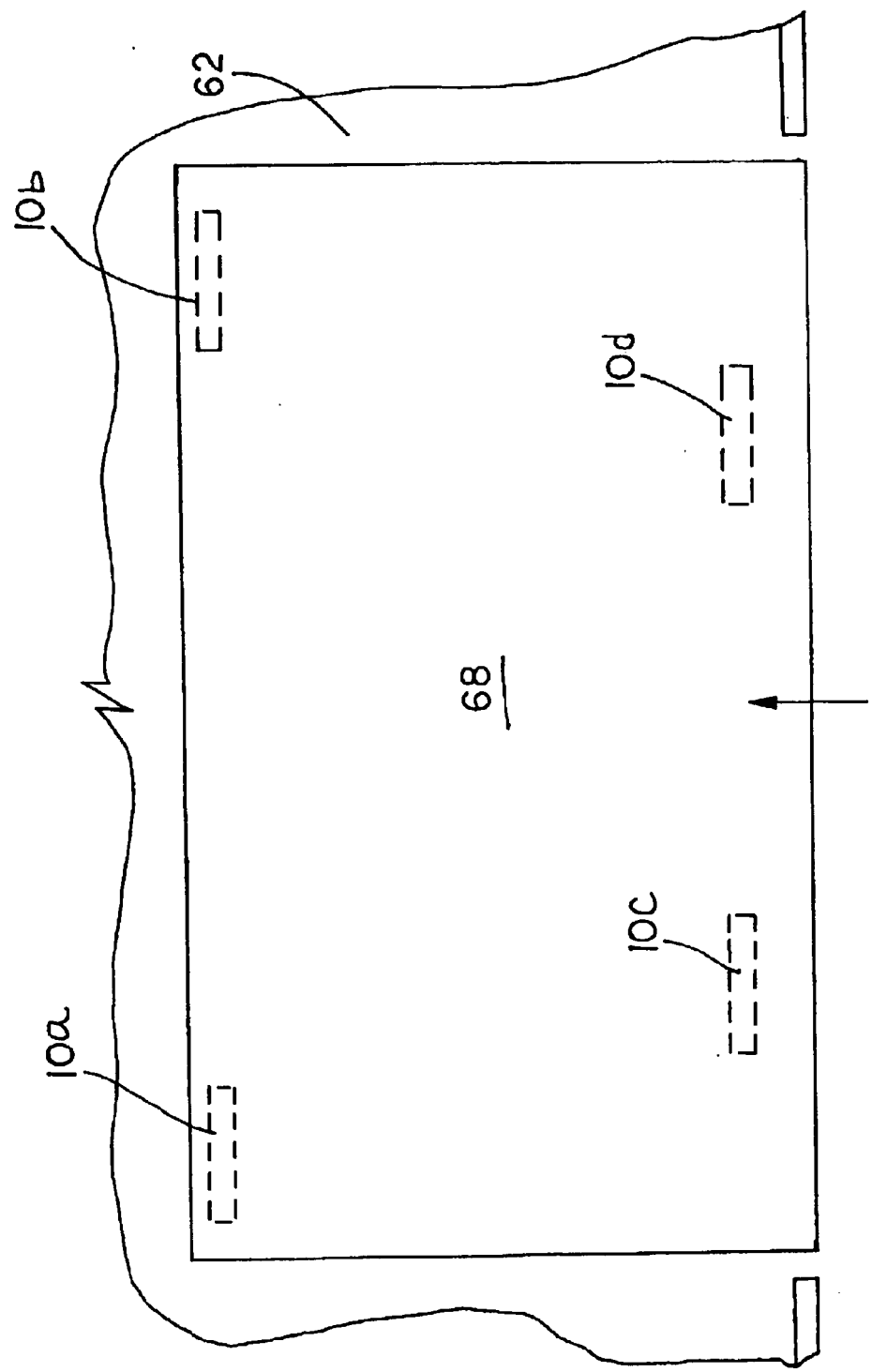
FIG. 4 is a top plan view illustrating the floor of the mobile living quarters in its fully retracted position over the floor of the main living quarters, the roller assemblies according to the present invention being illustrated in dash lines.
Figure 5:
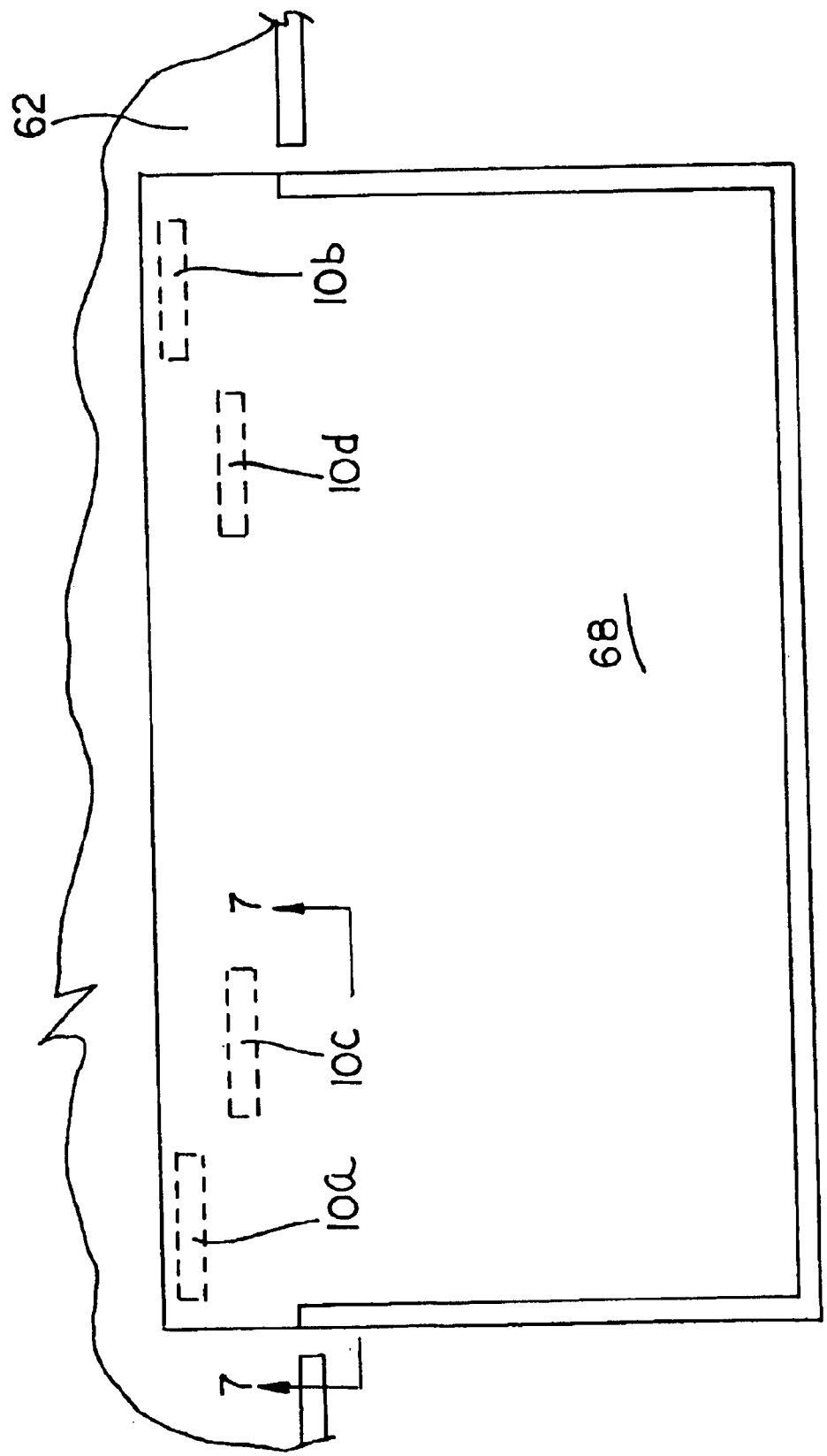
FIG. 5 is a view similar to FIG. 4, showing the floor in its extended position.

Referring now to the drawings, a roller assembly made pursuant to the teachings of the present invention is generally indicated by the number 10. Roller assembly 10 includes a frame 12 having ends 13 from which project flanges 14 carrying apertures 16 for attaching the frame 12 to the floor of the slide-out room or to the floor of the main living area of the transportable living quarters as will hereinafter be explained. Frame 12 further includes a longitudinal section 20 extending between ends 13. At approximately the center of longitudinal section 20, a nut 24 is secured to the longitudinal section 20 to provide a threaded opening therethrough. Nut 24 receives a threaded bolt 26 upon which a nut 28 is rotatably secured to act as a lock nut to secure the bolt 26 in a preselected position relative to the longitudinal section 20.

The end of the bolt 26 is provided with a threaded aperture 30, which receives screw 32. The length of screw 32 and depth of the bore 30 are such that a relatively substantial clearance is provided between the head of the screw 32 and the end of the bolt 26, as is most clearly illustrated in FIG. 6. Screw 32 extends through an aperture 34 in longitudinal section 36 of a roller carrier generally indicated by the number 38. Longitudinal section 36, along with side flanges 40, define a channel section of roller carrier 38 that receives an elongated cylindrical roller generally indicated by the numeral 42. Roller 42 includes a spindle 44 having a polygonal cross-section on the opposite ends thereof which is non-rotatably received in correspondingly shaped openings 46 in end flanges 48 defining the opposite ends of the roller carrier 38. Roller 42 further includes an elongated cylindrical body 50 that is mounted for rotation relative to the spindle 44 via appropriate internal bearings (not shown). The cylindrical body 50 includes an outer circumferential surface 52 upon which a semi-rigid pad 54 is mounted. The pad material 54 is resilient, and is made of a material that will not mark or mar the floor of the mobile living quarters as will hereinafter be explained. The cylindrical roller 42 is installed in the roller carrier 38 by installing the ends of the spindle 44 in the apertures 46, after the carrier 38 itself has been installed on frame 12 by inserting the screw 32 into the threaded aperture 30. Accordingly, because of the clearance between the end of screw 32 and the end of the bolt 26, rocking or articulating motion of the carrier 38 carrying the roller 42 is permitted as is indicated by the arrows in FIG. 6.

As is illustrated in FIGS. 2–5, the roller assemblies 10 are used to support a slide-out room generally indicated by the numeral 56 for movement from, and retraction into, the living area 58 of a transportable living quarters 60, which may be, for example, manufactured housing or a recreational vehicle. Main living quarters 58 is defined by a lower floor 62 across which the slide-out room 56 slides when it extends and retracts. The slide-out room 56, in addition to walls 64 and ceiling 66, includes a floor 68 which slides over the floor 62 of the main living area. As can be seen in FIGS. 2–5, a pair of roller assemblies 10 indicated as 10a and 10b are mounted at opposite corners of the floor 68 of the slide-out room and roll along the floor 62 of the main living quarters as the slide-out room is extended and retracted. Further, additional roller assemblies 10, indicated at 10c and 10d, are installed adjacent the outer edge 70 of the floor 62 of the main living quarters and roll along the underside of the floor 68 of slide-out room 56 as it extends and retracts. Roller assembled 10c and 10d are inverted as compared to roller assemblies 10a and 10b, so that the roller 52 faces upwardly to engage the underside of the floor of the slide out room. Otherwise, the rollers assemblies 10c and 10d are identical to the roller assemblies 10a and 10b. To assure proper support of the floor, the roller assemblies 10c and 10d are off-set inwardly from the roller assemblies 10A and 10b. As can be most clearly seen in FIGS. 3 and 5, as the slide-out room 56 approaches its outer extension limit, the roller assemblies 10a and 10b which move with the slide-out room approach, but do not reach, the plane defined by the roller assemblies 10c and 10d.

Figure 6:
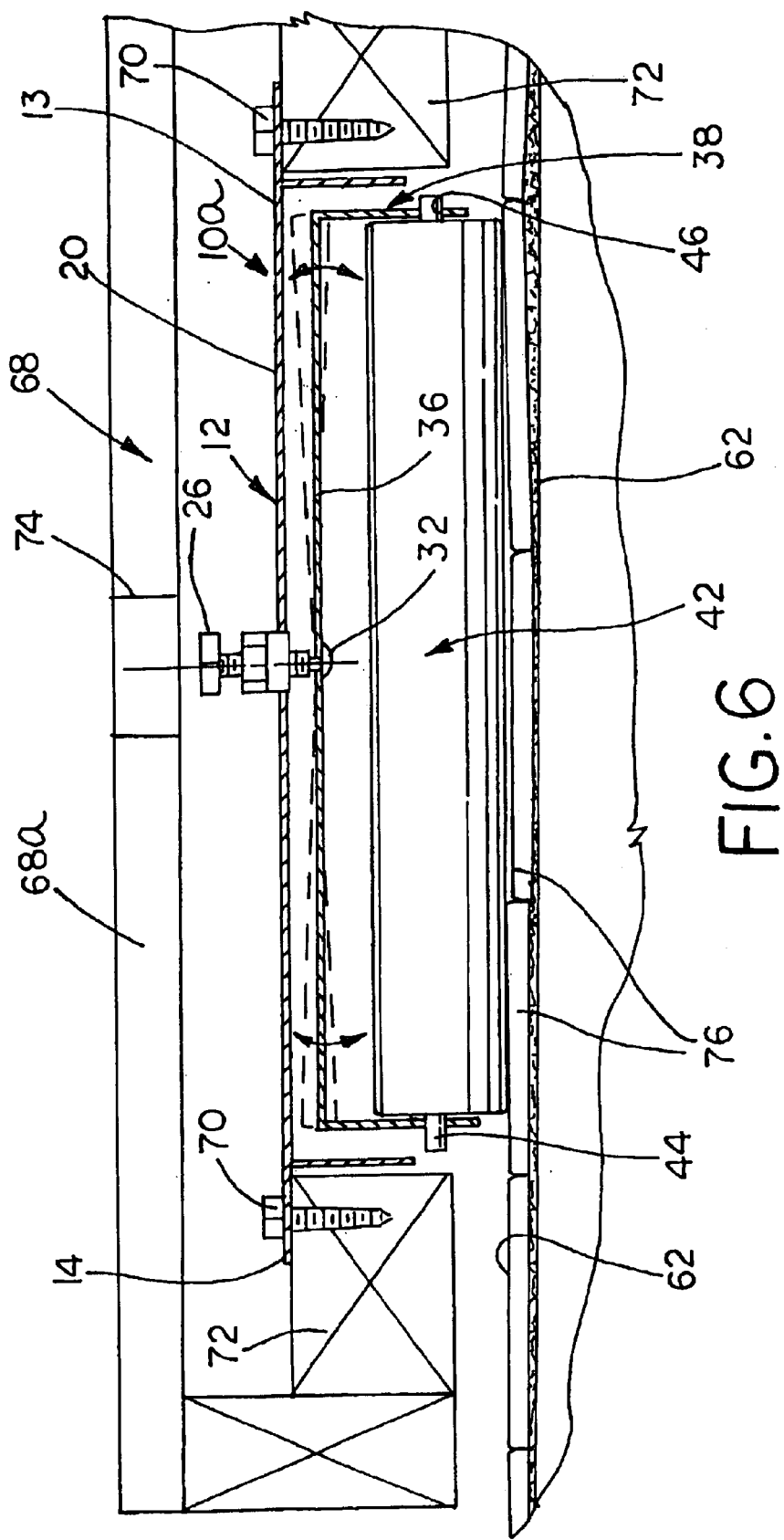
FIG. 6 is a longitudinal cross-sectional view taken substantially along lines 6—6 of FIG. 2.
Figure 7:
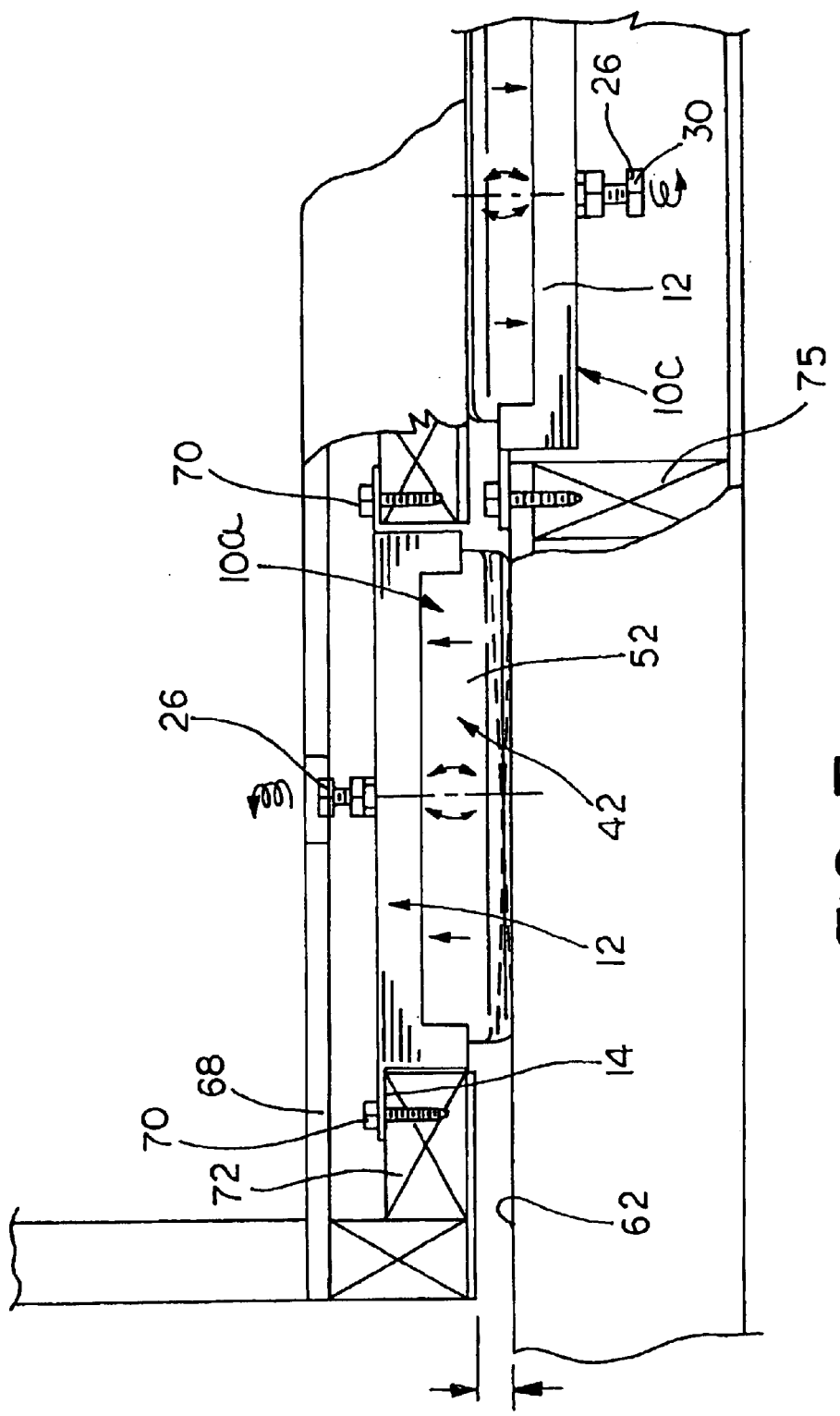
FIG. 7 is a view taken substantially along lines 7—7 of FIG. 5.

Referring to FIGS. 6 and 7, each roller assembly 10a and 10b is installed on floor 68 by appropriate fasteners 70 installed through apertures 16 of flanges 14 to secure the latter on sub-floor members 72. A relatively small access hole 74 is provided in main floor panel 68A to enable a tool to be inserted through the aperture 74 to engage the bolt 26. Accordingly, rotation of the bolt 26 expands or reduces the distance between the frame 12 and the roller carrier 38, so that this distance may be readily adjusted, thereby adjusting the height of the floor 68 above the floor 62 of the main living quarters. Similarly, roller assemblies 10c and 10d are installed on sub-floor members 74 of the main floor 62. The bolt 30 of roller assembly 10c may be accessed from below the floor of the main living quarters. As can be seen in FIG. 7, each of the bolts 30 can be adjusted to raise and lower their corresponding cylindrical rollers to thereby align and level the slide-out room so that the floor of the slide-out room will remain level and the slide-out room may be properly extended and retracted without binding.

Referring to FIG. 6, it is common in the manufactured housing and recreational vehicle industry to provide premium floor coverings, such as tile 76, as a floor covering for the floor 62 of the main living quarters. Commonly, a carpeted area adjoins the tiled area. Accordingly, the roller assemblies 10a and 10b must roll across both the carpeted and tiled areas all while keeping the slide-out room properly oriented with the opening through which it extends and retracts. Articulation of the rollers of the present invention with respect to the floors 62 and 68 facilitate this movement. Furthermore, in the retracted position, it is common that the rollers 10a and 10b will rest on the tile surface 76 for long periods of time during transport of the unit. Because the roller carrier 58 is permitted to articulate with respect to the frame 12, the roller assembly automatically adjusts for any unevenness of the floors, as indicated by the slight difference in level of the tiles 76, FIG. 6, while still distributing the weight of the slide-out room across as many tiles as possible, which, of course, is a function of the length of the rollers included within the assemblies 10a and 10c. Furthermore, again because the roller carrier 38 is permitted to articulate with respect to the frame 12 as indicated by the arrows in FIG. 6, any road vibrations or bumps will be accommodated by this articulation, so that the tiles 74 will not be damaged or marred. However, appropriate care must be taken to not tighten the roller against the floor too tightly by operation of the bolt 26 when the room is leveled.

Although four of the floor assemblies are illustrated as supporting the slide-out room in the Figures, a greater or fewer number of roller assemblies 10 may be required. Furthermore, the roller assemblies mounted on the floor of the living area in which the slide-out room rolls as it is extended and retracted may be omitted when the slide-out room is supported by a suspension system which automatically maintains the height of the outer portion of the slide-out room as it extends and retracts.

What I claim is:

1. A roller assembly used in combination with a slide-out room, wherein in said combination said slide-out room forms a part of a living area having a floor; said room having a retracted position protruding into said living area over said floor and an extended position protruding outwardly from said living area; said roller assembly including a frame, a carrier and a roller; said roller journalled to said carrier for rotative movement relative to the carrier; said carrier connected to said frame for rocking movement relative to the frame; said roller assembly positioned between said slide-out room and said floor with said frame secured to one of said slide-out room and floor and said roller engaging the other of said room and floor to accommodate movement of the room between its retracted and extended positions.

2. The combination roller assembly and slide-out room of claim 1 and a fastener anchored to said frame and extending to said carrier; said carrier having opposite ends; said rocking movement being about a horizontal axis and including each said end shifting toward and away from said frame; said fastener having an articulated connection to said carrier for allowing said rocking movement of the carrier relative to the frame.

3. The combination roller assembly and slide-out room of claim 2 wherein said fastener includes a bolt threaded into said frame and extending to said carrier; said articulated connection securing said bolt to said carrier; said bolt upon rotation relative to said frame causing said carrier to be adjustably moved toward and away from the frame.

4. The combination roller assembly and slide-out room of claim 3 wherein said carrier has a longitudinal section terminating in opposed end flanges; said roller extending between said end flanges; said articulated connection located at said longitudinal section generally midway between said end flanges.

5. A roller assembly for use in combination with a slide-out room; said slide-out room forming a part of a living area having a floor; said slide-out room having a retracted position protruding into said living area over said floor and an extended position protruding from said living area; said roller assembly comprising a frame, a carrier and a roller; said roller journalled to said carrier for rotative movement relative to the carrier; said carrier connected to said frame for rocking movement relative to the frame; said roller assembly adapted to be positioned between said slide-out room and said floor with said frame secured to one of said slide-out room and floor and with said roller engaging the other of said room and floor to accommodate movement of the room between its retracted and extended positions.

6. The roller assembly of claim 5 and a fastener anchored to said frame and extending to said carrier; said fastener having an articulated connection to said carrier to allow said rocking movement of the carrier relative to the frame.

7. The roller assembly of claim 6 wherein said fastener includes a bolt threaded into said frame and extending to said carrier; said articulated connection securing said bolt to said carrier; said bolt upon rotation relative to said frame causing said carrier to be adjustably moved toward and away from the frame.

8. The roller assembly of claim 7 wherein said carrier has a longitudinal section terminating in opposed end flanges; said articulated connection located at said longitudinal section generally midway between said end flanges; said rocking movement including shifting of said end flanges toward and away from said frame.

* * * * *